May 19, 1953     G. F. FELTON     2,638,867
INSIGNIA MOUNT
Filed Sept. 21, 1951
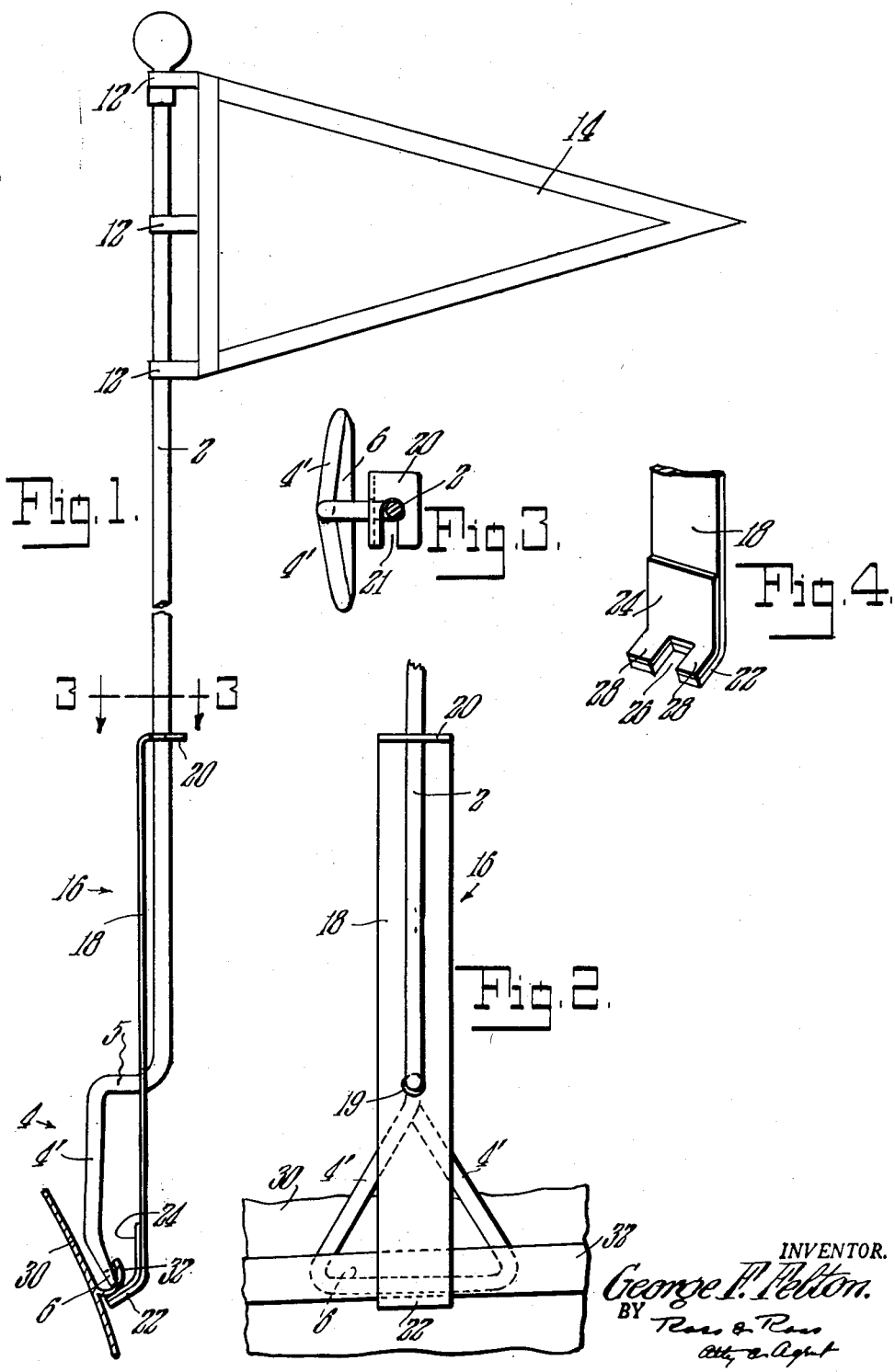
INVENTOR.
George F. Felton.

Patented May 19, 1953

2,638,867

UNITED STATES PATENT OFFICE 2,638,867

INSIGNIA MOUNT

George F. Felton, Millers Falls, Mass.

Application September 21, 1951, Serial No. 247,607

2 Claims. (Cl. 116—173)

This invention relates to improvements in mounts for removably securing an insignia to the rain gutter of a motor vehicle.

The principal objects of the invention are directed to the provision of a novel mount for associating insignia with a motor vehicle.

The mount of the invention is adapted for many and various uses but is particularly adapted for attaching an insignia to vehicles to indicate that the vehicles are in formation for funeral purposes.

According to novel features of the invention, the mount is readily attached to and removed from the rain gutter of an automobile and is so constructed and arranged to present insignia in the manner desired.

All of the above objects I accomplish by means of such structure and relative arrangements of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claims hereunto annexed and more fully described and referred to in connection with the accompanying drawings wherein:

Fig. 1 is a side elevational view of a mount embodying the novel features of the invention;

Fig. 2 is a front elevational view of the lower portion of the mount shown in Fig. 1;

Fig. 3 is a sectional view on the line 3—3 of Fig. 1; and

Fig. 4 is a perspective view showing a modified view of the lower foot portion of the clamp of the mount.

Referring now to the drawings more in detail, the invention will be fully described.

An elongated mast 2 is provided which may be formed from wire so as to be relatively stiff and be somewhat resilient.

The lower end portion 4 of the mast is offset rearwardly at 5 so as to lie in substantial parallelism with the main body of the mast and said lower portion is triangular in form so as to have relatively diverging side arms 4' and a lower extremity 6 of appreciable length, see Fig. 2.

The side arms 4' are formed so that the extremity 6 is disposed outwardly and forwardly thereof, see Fig. 1.

The upper end of the mast is arranged to receive tie members or loops 12 of an insignia member 14. The member 14 may take any form and carry any indicia or information desired.

A clamp 16 is formed to have an elongated body portion 18 which is provided at its upper end with an angularly disposed lock member 20 and a lower foot 22 extending from the body in a direction opposed to the lock.

Said foot 22 of the clamp is preferably lined with resilient material such as felt, rubber composition secured thereto, and indicated by 24.

In Fig. 4 the foot is shown as having a slot 26 to provide spaced ears 28 and may be desirable in some instances.

The body 18 of the clamp is provided with an opening 19 in which a portion 5 of the mast between the offset portion and main body of the mast is disposed. The opening is arranged for movements of the mast and clamp.

The lock member 20 of the clamp 16 is provided with a locking slot 21 open at one side of said member 20 which is adapted to receive and releasably hold the mast, see Fig. 3.

A portion 30 of the roof of an automobile is shown in Figs. 1 and 2 and a rain gutter 32 is provided therealong to which the mount of the invention is secured.

In operation of the mount with the mast 2 removed from the locking slot 21 of the clamp, the lower member 6 of the mast is inserted in the gutter 32 so as to engage the inner side thereof.

The clamp 16 is positioned so that the lower foot 22 engages the outer side of the gutter and it is moved on part 5 of the mast to bring the mast into the locking slot as shown in Fig. 3.

The mast and clamp are so constructed and arranged that with the mast 2 in the locking slot, the gutter is yieldingly engaged between the lowermost end portion of the mast and foot portion of the clamp. In this way, the mount is secured to the gutter with the mast extending upwardly in the desired vertical relation.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Insignia mounting means adapted for securement to the rain gutter of an automobile comprising in combination, a mast for an insignia and a clamp, said mast including an elongated rod like member formed to have an upper vertical main body portion and an intermediate horizontal offset portion extending rearwardly from the lower end thereof and a lower vertical portion extending downwardly from said intermediate portion in parallelism with said body and provided with a lower extremity for engagement with the inner side of a rain gutter, said clamp being in the form of an elongated strip having vertical a main body and upper lock end and lower gutter engaging end and provided with a hole intermediate said ends in which the horizontal portion of said mast is disposed for relative swinging of said clamp and mast, said lower end of the clamp being inclined towards the lower extremity of said mast, said upper lock end of the clamp extending at right angles relative to the body thereof in a plane intersecting a vertical plane extending through the longitudinal axis of the upper main body portion of the mast and provided with a locking slot extending inwardly of an edge thereof for slidably receiving a portion of the main body of the mast, all adapted and arranged whereby with the lower extremity of the mast in engagement with the inner side of a gutter and the mast extending upwardly at right angles therefrom the clamp may be swung on the intermediate portion of the mast to engage the lower end of said clamp with the outer side of the gutter and engage the mast in the locking slot of the lock end of said clamp, for clamping of the gutter between the down extremity of the mast and lower end of the clamp.

2. Insignia mounting means adapted for securement to the rain gutter of an automobile comprising in combination, a mast for an insignia and a clamp, said mast including an elongated rod like member formed to have an upper vertical main body portion and an intermediate horizontal offset portion extending rearwardly from the lower end thereof and a lower vertical portion extending downwardly from said intermediate portion in parallelism with said body and provided with a lower extremity for engagement with the inner side of a rain gutter, said clamp being in the form of an elongated strip having vertical a main body and upper lock end and lower gutter engaging end and provided with a hole intermediate said ends in which the horizontal portion of said mast is disposed for relative swinging of said clamp and mast, said lower end of the clamp being inclined towards the lower extremity of said mast, said upper lock end of the clamp extending at right angles relative to the body thereof in a plane intersecting a vertical plane extending through the longitudinal axis of the upper main body portion of the mast and provided with a locking slot extending inwardly of an edge thereof for slidably receiving a portion of the main body of the mast, the lower portion of the mast extending downwardly and outwardly from said intermediate portion to one end of said extremity and forms an opposite end thereof upwardly and inwardly towards said intermediate portion and said extremity being disposed in a plane forwardly of the critical plane of the lower portion of the mast, all adapted and arranged whereby with the lower extremity of the mast in engagement with the inner side of a gutter and the mast extending upwardly at right angles therefrom the clamp may be swung on the intermediate portion of the mast to engage the lower end of said clamp with the outer side of the gutter and engage the mast in the locking slot of the lock end of said clamp, for clamping of the gutter between the down extremity of the mast and lower end of the clamp.

GEORGE F. FELTON.

References Cited in the file of this patent

UNITED STATES PATENTS

| Number | Name | Date |
|---|---|---|
| 672,380 | Larzelere | Apr. 16, 1901 |
| 739,300 | Essig | Sept. 22, 1903 |